E. I. HUNT.
TOOL HOLDER FOR LATHES.
APPLICATION FILED NOV. 22, 1918.
1,304,051.
Patented May 20, 1919.
2 SHEETS—SHEET 2.
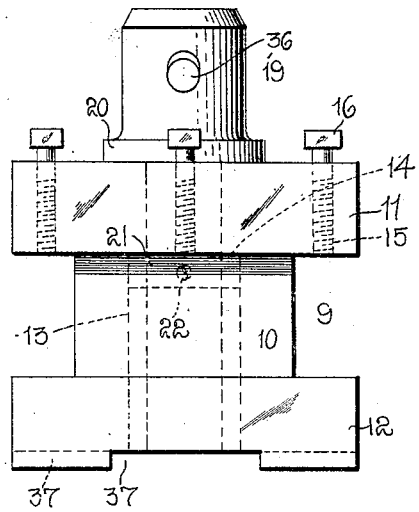
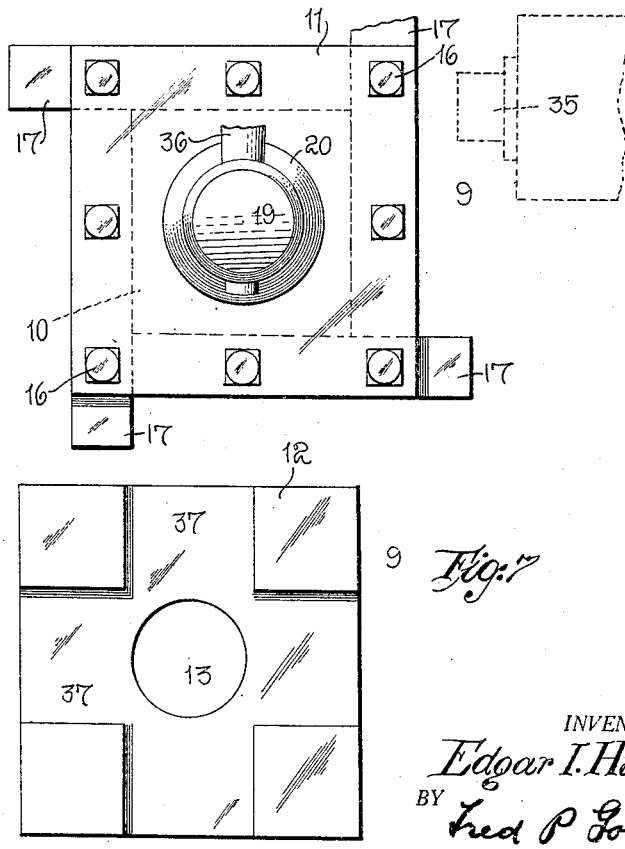
INVENTOR.
Edgar I. Hunt
BY Fred P Lorm
ATTORNEY.

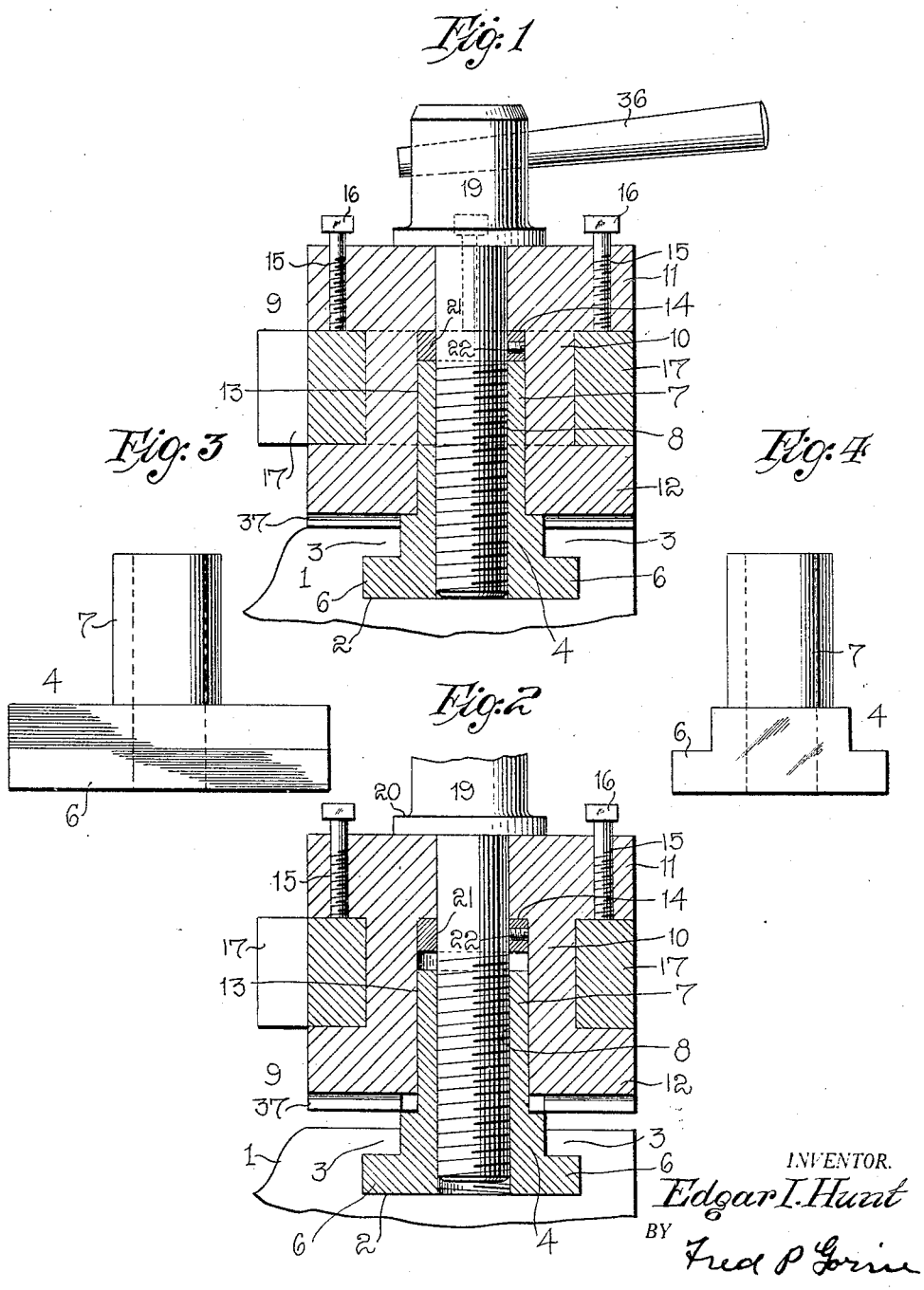

UNITED STATES PATENT OFFICE.

EDGAR I. HUNT, OF EDMONDS, WASHINGTON.

TOOL-HOLDER FOR LATHES.

1,304,051.  Specification of Letters Patent.  Patented May 20, 1919.

Application filed November 22, 1918. Serial No. 263,766.

*To all whom it may concern:*

Be it known that I, EDGAR I. HUNT, a citizen of the United States, residing at Edmonds, in the county of King and State of Washington, have invented certain new and useful Improvements in Tool-Holders for Lathes, of which the following is a specification.

This invention relates to improvements in tool holders for lathes.

The object of the invention is to provide a holder to receive and firmly hold a plurality of tools, any one of which may be brought into position to operate upon a piece of work held by an adjacent chuck or the like, the mechanism being so arranged that when a tool becomes worn or broken, the holder may be operated to place another tool in position to quickly continue the work.

A further object of the invention is to provide a swiveled tool holder wherein a plurality of tools are held in readiness to be used to expedite the work should any one of the tools wear or break.

The invention also comprehends improvements in the details of construction and arrangement of parts which will be hereinafter described and particularly pointed out in the claims.

In the drawings:—

Figure 1 is a transverse section illustrating the tool holder locked in position on the cross feed.

Fig. 2 is a similar view illustrating the position of the parts when shifting tools.

Fig. 3 is a side elevation of the base on which the tool holder rotates.

Fig. 4 is an end view of same.

Fig. 5 is an end view of the tool holder.

Fig. 6 is a top plan view of the same.

Fig. 7 is a bottom plan view of same.

1 indicates the cross feed of a lathe, having in its upper face a recess 2, provided with parallel flanges 3. Operatively mounted in the recess 2, is a base 4, having lateral flanges 6, which engage under the flanges 3, and extending vertically from the base is a cylindrical hub 7. A vertical threaded opening 8, extends through the hub 7, and the base 4, as clearly shown in the drawings.

Mounted on the hub 7, is a tool holder 9, comprising a hollow central body portion 10, and upper and lower flanges 11 and 12, there being an opening 13, centrally located in the holder to fit over the hub. The opening 13, is formed with a shoulder 14, and the upper flange is provided with threaded openings 15, to receive clamp screws 16, and in the bottom of the lower flange are right angular recesses 37, in which the top of the base is adapted to fit. Tools indicated at 17, are positioned between the upper and lower flanges 11 and 12, and the clamp screws engage the upper surfaces of the tools to hold same in fixed position, as will be presently explained.

A threaded bolt 19, extends through the tool holder, the head 20 of the bolt engaging the top of the holder, and the threaded portion engaging in the threaded opening 8, in the hub. A collar 21, is secured to the bolt by a set screw 22, and is located between the shoulder 14, and the top of the hub, that portion of the bolt above the collar being smooth to rotate freely in the opening 13, whereby a swivel connection is formed between the bolt and the tool holder.

In operation, the base 4 is slid into the recess 2, and then the tool holder 9, is placed on the hub 7, and by means of a handle 36, the bolt 19 is rotated and its threaded engagment draws the holder down toward the base.

Tool 17 may be inserted between the flanges of the holder before or after this operation. The tools are inserted between the flanges, and are clamped by the clamp screws 16, one face of the body portion of the tools bearing against the body portion 10, of the holder, while the cutting edges project some distance beyond the flanges 11 and 12, and in the path of the work indicated at 35. It is to be noted that in the illustration shown, four tools are clamped in position, each projecting from the holder at ninety degrees with reference to the other, consequently but one tool at a time is presented to the work.

Assume the tools are properly clamped, the bolt 19 is further rotated, and the tool holder 9 is forced down into engagement with the top of the base 4, and the top of the cross feed, the base snugly fitting in the recess 37, formed in the bottom of the tool holder.

Obviously when the bolt is rotated the tool holder is forced down on the hub, since the bolt rotates freely in the holder.

The lathe is operated in the usual way, and the tool 17 projecting in the path of the work is used until its usefulness is worn out, or it breaks. Now if it be desired to present another tool, the handle is rotated to reversely rotate the bolt 19, and the collar 21 acts to elevate the tool holder on the hub, until the bottom of the holder is above the bottom of the base 4. Then the tool holder is rotated one quarter turn, which presents the next tool in position to operate on the work. The desired tool having been located, the bolt 19 is screwed down, and the tool holder is forced over the upper edges of the base in the same manner as previously described.

From the foregoing description, it will be seen that I have provided a simple and effective means for holding a plurality of tools, and one which may be quickly and conveniently operated to present another tool when desired. It will also be seen that by the construction described, little loss of time will occur when changing tools.

What I claim is:—

1. In apparatus of the character described, a cross-feed of a lathe having a recess and spaced flanges at the top of the recess; a base arranged in the recess and having flanges to engage beneath the first named flanges, said base being polygonal in cross section and projecting above the cross-feed for a substantial distance; a tubular cylindrical hub rigidly secured to the base and internally screw threaded; a polygonal tool holder having an opening to loosely receive the hub, said polygonal tool holder being provided in its bottom with radial recesses to receive the upper end of the base to thereby lock the tool holder against rotation; a set screw passing through an opening in the top of the tool holder and engaging within the opening of the hub; and means to secure tools to the sides of the polygonal tool holder.

2. In apparatus of the character described; a cross feed of a lathe; a base secured to the cross-feed and projecting above the same, said base being polygonal in cross section; a tubular cylindrical hub rigidly secured to the base and internally threaded; a polygonal tool holder having a main bore to loosely receive the hub and an opening at the top of the main bore for forming a shoulder, said polygonal tool holder being provided in its bottom with radial recesses to receive the upper end of the base to thereby lock the tool holder against rotation; a set screw passing through said opening and engaging within the tubular hub, said set screw being provided above the tool holder with a head to contact therewith; a ring clamped to the set screw and arranged within the main bore of the tool holder above the hub and serving to raise the tool holder; means to turn the set screw; and means for securing tools to the sides of the polygonal tool holder.

In testimony whereof I affix my signature.

EDGAR I. HUNT.

Copies of this patent may be obtained for five cents each, by addressing the "Commissioner of Patents, Washington, D. C."